United States Patent [19]
Behnke et al.

[11] Patent Number: 6,055,307
[45] Date of Patent: Apr. 25, 2000

[54] SYSTEM AND METHOD FOR SELECTING AGENT DESTINATIONS AND MONITORING CALLS MADE TO NETWORK CUSTOMERS

[75] Inventors: Frank Behnke, Belle Mead; Brenda Casselman, Matawan; Mohammed Hussain, Hamilton Square; Shuhung Lo, Piscataway; Suhasini V. Sabnis, Marlboro; Kishor Shah, Parlin; Gerald Michael Wert, New Providence, all of N.J.

[73] Assignee: AT&T Corp., New York, N.Y.

[21] Appl. No.: 08/672,789

[22] Filed: Jun. 28, 1996

[51] Int. Cl.⁷ .............. H04M 3/42; H04M 7/00; H04M 3/00
[52] U.S. Cl. .......... 379/265; 379/210; 379/221; 379/309
[58] Field of Search .............. 379/67, 88, 89, 379/201, 265, 266, 267, 280, 210, 221, 258, 273, 309, 308

[56] References Cited

U.S. PATENT DOCUMENTS

| | | | |
|---|---|---|---|
| 3,643,034 | 2/1972 | Burns et al. | 379/67 |
| 4,737,983 | 4/1988 | Frauenthal et al. | 379/221 |
| 4,788,718 | 11/1988 | McNabb et al. | 379/113 |
| 4,953,204 | 8/1990 | Cuschleg et al. | 379/266 |
| 5,164,983 | 11/1992 | Brown et al. | 379/265 |
| 5,291,550 | 3/1994 | Levy et al. | 379/242 |
| 5,291,551 | 3/1994 | Conn et al. | 379/265 |
| 5,309,505 | 5/1994 | Szlam et al. | 379/88 |
| 5,329,583 | 7/1994 | Jurgensen et al. | 379/266 |
| 5,369,695 | 11/1994 | Chakravarti et al. | 379/211 |
| 5,381,479 | 1/1995 | Gardeck et al. | 380/21 |
| 5,390,243 | 2/1995 | Casselman et al. | 379/265 |
| 5,444,774 | 8/1995 | Friedes | 379/266 |
| 5,459,780 | 10/1995 | Sand | 379/265 |
| 5,481,602 | 1/1996 | Griffiths et al. | 379/210 |
| 5,488,632 | 1/1996 | Mason et al. | 375/260 |
| 5,530,744 | 6/1996 | Charalambous et al. | 379/265 |
| 5,557,668 | 9/1996 | Brady | 379/212 |
| 5,592,542 | 1/1997 | Honda et al. | 379/265 |
| 5,757,897 | 5/1998 | LaBarbera et al. | 379/165 |
| 5,825,869 | 10/1998 | Brooks et al. | 379/265 |

*Primary Examiner*—Fan S. Tsang
*Assistant Examiner*—Allan Hoosain
*Attorney, Agent, or Firm*—Morgan & Finnegan, LLP

[57] ABSTRACT

A system of the present invention selects agent destinations and monitors calls made from a caller through an intelligent call processing network to a network customer. A plurality of home agents, such as part of a telemarketing system, are located at respective home premises and receive routed calls. A customer routing point responds to call queries transmitted from the intelligent call processing network and routes the call to the desired home agent. A management information server is connected in communication to the customer routing point for storing call routing and agent call-handling information. At least one agent manager is connected in communication to at least one of the home agents for monitoring the home agent and maintaining agent availability, routing configurations and statistical information concerning log-in and usage. Each agent manager is interconnected with the customer routing point for transmitting agent availability and routing configurations to the customer routing point.

8 Claims, 8 Drawing Sheets

SYSTEM AND METHOD FOR SELECTING AGENT DESTINATIONS AND MONITORING CALLS MADE TO NETWORK CUSTOMERS

FIELD OF THE INVENTION

This invention relates to a system and method for selecting agent destinations such as part of a telemarketing center and monitoring the calls routed through the phone network to the agent.

BACKGROUND OF THE INVENTION

In many telemarketing applications, one calls a customer number, such as a Toll Free Services Number, and is transferred to an agent typically located at a customer operated telemarketing center or satellite office. In most of these systems, the customer has a computer database located at a main corporate office and at least one Automatic Call Distributor (ACD), located with the agent at a telemarketing center or satellite office. The customer premises equipment typically includes a large mainframe computer that receives calls and then distributes the calls to agents located at the customer operated satellite office. These large mainframe computers also can service the calls for various call forwarding options and can include systems working in conjunction with the intelligent call processing network.

The Automatic Call Distributors route calls to selected agents at a customer office or a customer operated telemarketing center or satellite office based on criteria such as caller's geographic location, age or purchasing requirements. Examples of similar telemarketing systems or of systems used in conjunction with similar telemarketing systems are described in U.S. Pat. Nos. 4,737,983 to Frauenthal et al.; 4,788,718 to McNabb et al.; 4,953,204 to Cuschleg et al.; 5,291,550 to Levy et al.; 5,369,695 to Chakravarti et al.; 5,444,774 to Friedes; 5,481,602 to Griffiths; and 5,488,632 to Mason et al., the disclosures which are hereby incorporated by reference in their entirety.

Many customers are now requiring their telemarketing groups to downsize staffs and reduce the hardware cost associated with operating these groups at corporate and satellite offices. As a result, more customers desire telemarketing and similar agents to be located at home premises, instead of customer operated telemarketing centers or satellite offices. It would be advantageous if many of the advantages and benefits of those systems using complex customer operated mainframes and Automatic Call Distributors as described above were available using home agents without the hardware and system requirements described above. This type of system would be advantageous because large computers acting as Automatic Call Distributors and similar systems and devices would not be necessary.

SUMMARY OF THE INVENTION

The present invention is advantageous over numerous prior art telemarketing and similar systems using Automatic Call Distributors and large mainframe systems located at customer offices, because calls can now be routed to home agents typically located at their home residential premises, while allowing agent managers to monitor these routed calls. The agent managers also maintain agent availability and routing configurations.

In accordance with the present invention, calls made through the intelligent call processing network to a nework customer are routed to a selected home agent located typically at their home residential premises for further transaction processing with the customer. For example, a network customer, typically a large national retailer, uses a telemarketing system having one or more Toll Free Services Numbers. A caller desiring to use the telemarketing service calls the Toll Free Services Number and is routed to a home agent for further transaction processing with the customer.

In one aspect of the invention, a customer routing point responds to call queries transmitted from the intelligent call processing network and routes the call to a desired home agent. A management information server is connected in communication to the customer routing point for storing call routing and call-handling information.

At least one agent manager is connected in communication to at least one of the home agents for monitoring the home agent and maintaining agent availability and routing configurations. Each agent manager is interconnected with the customer routing point for transmitting agent availability and routing configurations to the customer routing point.

In another aspect of the present invention, a supervisor is operatively connected to the agent manager, and remotely logs into the agent manager and monitors the activities of the home agent. The supervisor typically has a personal computer, and can be located at a home premises or at a satellite office or telemarketing center operated by the customer. The agent manager also can be located at a customer operated satellite office, at a home premises, or even within the intelligent call processing network as a separate network component.

Typically, a caller database is located at a customer office or a satellite office and stores information about individual callers and about previous transactions between the customer and caller. Using network resources, the identity of an incoming call is determined and, based on caller identification, that caller record is retrieved from the caller database, and then routed to the appropriate home agent. The previous transaction information and other caller data is then present on the computer screen of the home agent when the call is routed to the home agent.

In another aspect of the present invention, a home agent connects to the intelligent call processing network through a POTS line. The home agent includes a Netblazer router for communicating with the agent manager through a wide-area network. In another aspect of the invention, a home agent connects to the intelligent call processing network through an ISDN line. The home agent includes an ISDN remote router for communicating with the agent manager by a wide area network.

In still another aspect of the present invention, the customer routing point forwards a call to the intelligent call processing network for further processing when a home agent is unavailable to receive a call. The customer routing point can include system and hardware for queuing calls within the intelligent call processing network. Also, the customer routing point is responsive to a query from a customer home page on the Internet for routing an Internet user to a home agent. The customer routing points can also include a storage stack for maintaining a list of available home agents. A call is directed to the home agent that has been idle the longest.

In still another aspect to the present invention, a TOPMS management system receives and collects data relating to each incoming call and the status of any transaction relating to a customer. This data collection means also collects data on call traffic origin and logic from the intelligent call processing network. This data is processed to determine logic patterns for routing calls to home agents.

BRIEF DESCRIPTION OF THE DRAWINGS

The foregoing features and advantages of the present invention can be appreciated more fully from the following description, with references to the accompanying drawings in which.

DETAILED DESCRIPTION OF THE INVENTION

Figure 1:
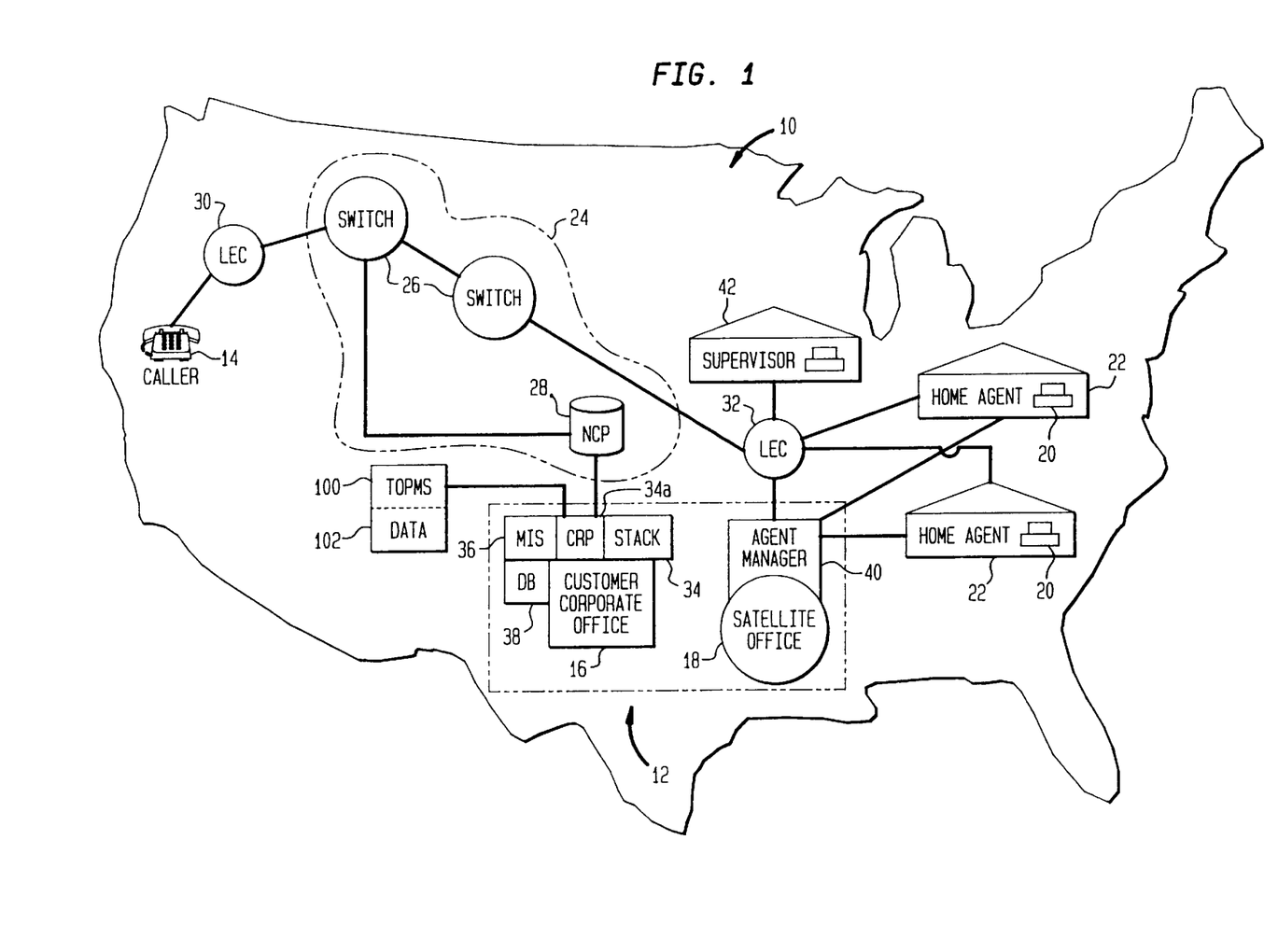
FIG. 1 is a high level schematic diagram of the system and method for selecting agent destinations and monitoring the calls in accordance with the present invention.

Referring now to the drawings, and more particularly to FIG. 1, there is illustrated at the system of the present invention that allows a network customer, indicated generally at 12, which selects home agent destinations while also monitoring calls made by a caller 14. The network customer 12 can be a national retail chain having a telemarketing group that is reached by a Toll Free Services Number. Typically, in many prior art systems, a telemarketing group includes a mainframe computer located either at a customer corporate office 16 and at a telemarketing center and a customer operated satellite office 18. These mainframes often include Automatic Call Distributors (ACD). With the increasing demand made on corporations to downsize in recent years, Automatic Call Distributors and similar main frame systems are no longer desired because of the expense in purchasing the systems and maintaining them.

As shown in the high level block diagram of FIG. 1, the system 10 includes a plurality of home agents 20, each located at a home premises or residence 22, typically the residence of the home agent. Calls made through the intelligent call processing network 24 to the network customer 12 are routed to a home agent 20 for further transaction processing with the customer. As is typical, the intelligent call processing network 24 includes various network switches 26 and a network control point 28. The network switches 26 connect to an originating Local Exchange Carrier (LEC) 30 and a terminating local exchange carrier 32.

As illustrated, a Customer Routing Point (CRP) 34 (which can also be a network element) responds to call queries made from the intelligent call processing network 24 and routes a call to a desired home agent destination. A Management Information Server (MIS) 36 is connected in communication to the customer routing point 34 and stores call routing and agent call-handling information. The network control point 28 queries the customer routing point 34 for routing instructions.

Additionally, a customer data base 38 is located typically at the customer corporate office 16 and stores information about individual callers and their previous transactions. This information is used for completing future caller transactions and maintaining caller statistics. When the routing label is forwarded to the network control point 28, the call is switched to an appropriate home agent 20. Information about the caller, including their previous transactions and current address, can be forwarded from the customer data base 38 through the intelligent call processing network 24 to the home agent 20.

As illustrated, an agent manager 40 is connected in communication to at least one of the home agents 20 and monitors the activities of home agent. The agent manager 40 maintains agent routing configuration. The agent manager 40 notifies an operator at the agent manager station whenever a home agent' call-handling state changes, such as when an agent is unavailable to handle a call, is on a call, or on break. Each agent manager 40 is connected with the customer routing point 34 for transmitting agent availability and associated routing configuration to the customer routing point 34.

A supervisor 42 is operatively connected to an agent manager 40 and can remotely log into an agent manager 40 for monitoring the activities of the agent manager 40. A supervisor 42 has similar functional capabilities as an agent manager 40, and the additional capability of allowing a supervisor to log remotely into the agent manager and monitor the agent's activities. The supervisor 42 also can remotely log into the management information server 36, directing the server 36 to generate historical reports.

Typically the supervisor 42 includes a personal computer, a phone/head set and a phone monitoring device, usually a separate board entered into the personal computer. An agent manager 40 also typically includes a personal computer. For purposes of description, the supervisor 42 is also referred to as a supervisor PC.

Referring now to FIGS. 2 through 7, six different embodiments of the present invention are illustrated that show various ways the home agents 20, agent managers 40, supervisors 42, customer routing point 34, management information server 36 and other components are connected together for the present invention.

Figure 2:
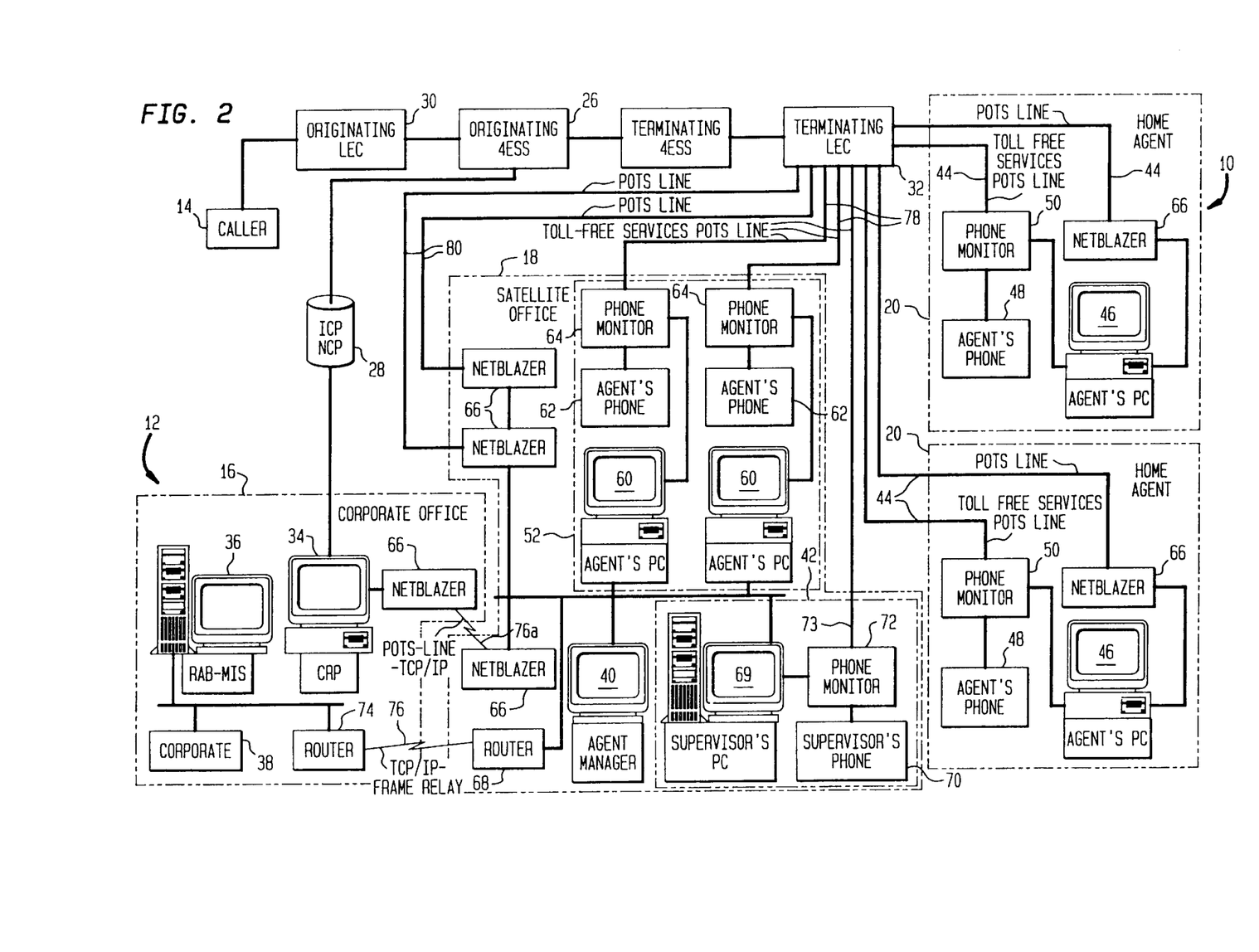
FIG. 2 is a high level schematic diagram of one embodiment of the present invention showing a corporate office, satellite office, and home agents connected to the network by a POTS line to the phone network, and a PC supervisor and an agent manager located at a customer operated satellite office.

FIG. 2 illustrates an embodiment where a home agent 20 is located at a home residence 22 and connected by a POTS line 44 to a terminating local exchange carrier 32. The home agent 40 includes a personal computer 46, an agent phone 48, and phone monitor board 50 inserted in a personal computer slot. This board 50 allows monitoring activities. A supervisor 42 can be located at a customer operated satellite office with an agent manager 40. As illustrated, one or more agent managers 40 can be located at these customer-specified regional locations, also called customer operated satellite offices 18, and connected to the customer routing point 34 via a wide area network.

Because a satellite office 18 is used, one or more remote agents 52 similar in function to home agents 20 are also co-located with an agent manager 40 at the satellite office 18. The remote agents 52, similar to home agents 20, also include a personal computer 60, phone monitor board 64, and combination phone/headset 62. The agent manager 40 is connected to the remote agent's personal computers 60 via a local area network. The remote agents 52 that are co-located with the agent manager 40 can use a Toll Free Service, such as either a Megacom Toll Free Service or Readyline Toll Free Service by AT&T for receiving phone calls. Home agents 20 are connected to the agent manager 40 via a Wide Area Network (WAN) and require a Netblazer router 66 or similar device and a POTS phone line 44 for data communication with the agent manager 40. The home agent 20 can use a Toll Free Service such as a Readyline Toll Free Service for receiving phone calls. As illustrated, a home agent 20 communicates with the customer corporate data base 38 via a router 68 located at the satellite office 18.

A supervisor 42 is located in the satellite office 18 and monitors the home agent 20 through the agent manager 40 or remotely logs into an agent manager 40. The supervisor 42 includes a personal computer 69, phone 70, and phone monitor board 72. The supervisor 42 connects to the LEC 32 by a toll free POTS line.

All agent managers 40 are connected to the management information server 36 via a wide area network. The customer routing point 34 is connected to the management information server 36 through a wide area network. In this particular embodiment, the management information server 36 and customer routing point 34 are located in a customer corporate office 16. These two components could alternately be located at any customer office, including a satellite office 18.

The corporate database 38 is located at a corporate office 16. The database 38 could be on the same LAN as the management information server 36. This database 38 also connects to the satellite office 18 via a router 74 and a TCP/IP FrameRely 76 to the router 68 at the satellite office 18. The remote agents 52 are connected by a POTS line 78 to the terminating local exchange carrier 32. The satellite office 18 includes Netblazer routers 66 that connect to the terminating LEC via a POTS line 80. Another Netblazer router 66 connects via TCP/IP FrameRely 76 to another Netblazer router 66, which is connected to the customer routing point 34.

Figure 3:
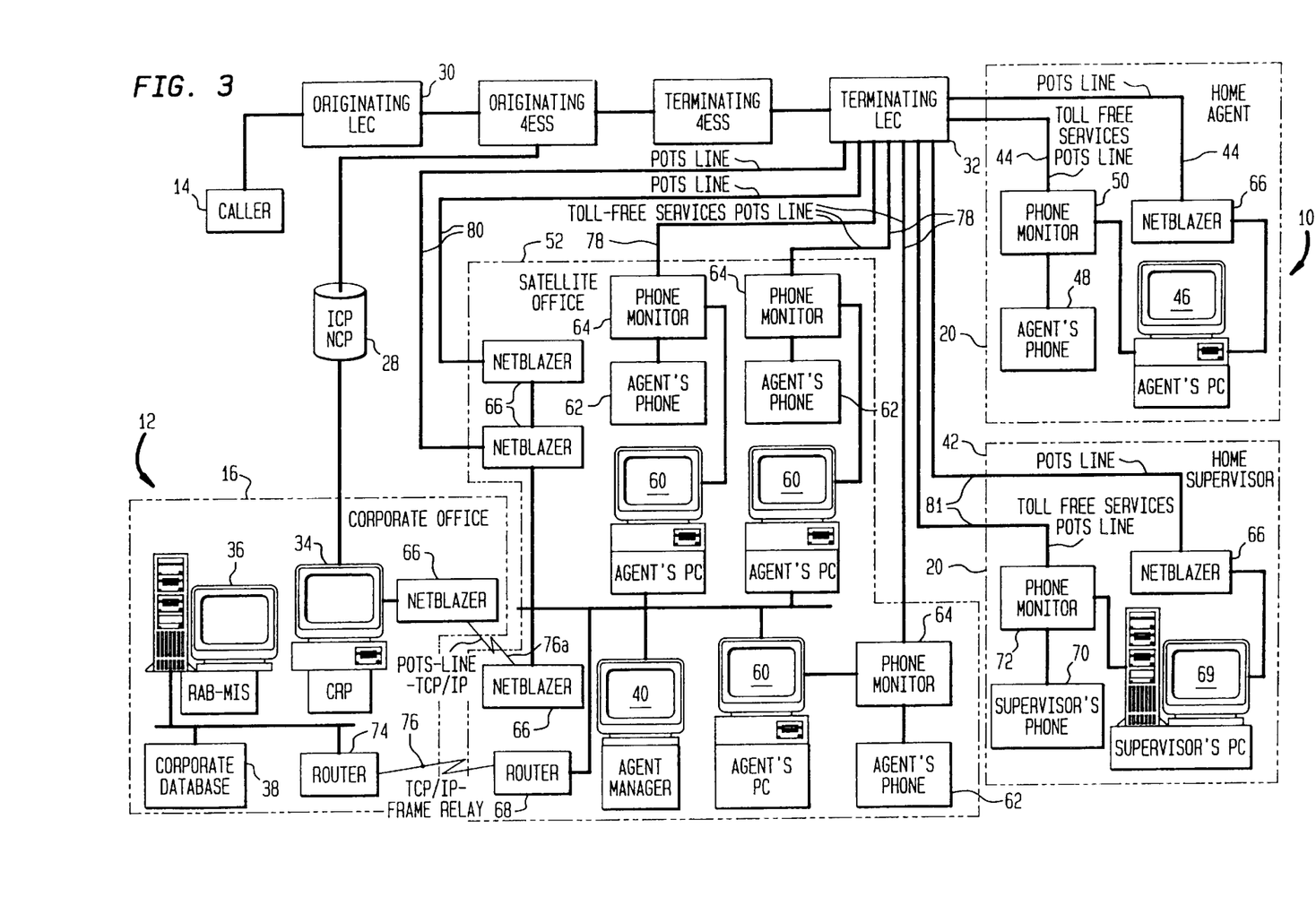
FIG. 3 is another high level schematic diagram of another embodiment showing a home agent connected to the network by a POTS line, the supervisor located at a home premises, and an agent manager located at a satellite office.

FIG. 3 illustrates another embodiment where the supervisor 42 is located at a home residential premises and connected by a POTS line 80 to the terminating local exchange carrier 32 while the agent manager 40 is still located at the satellite office 18. Operation is similar as before except the supervisor 42 includes a Netblazer router 66 connected to the POTS line 80.

Figure 4:
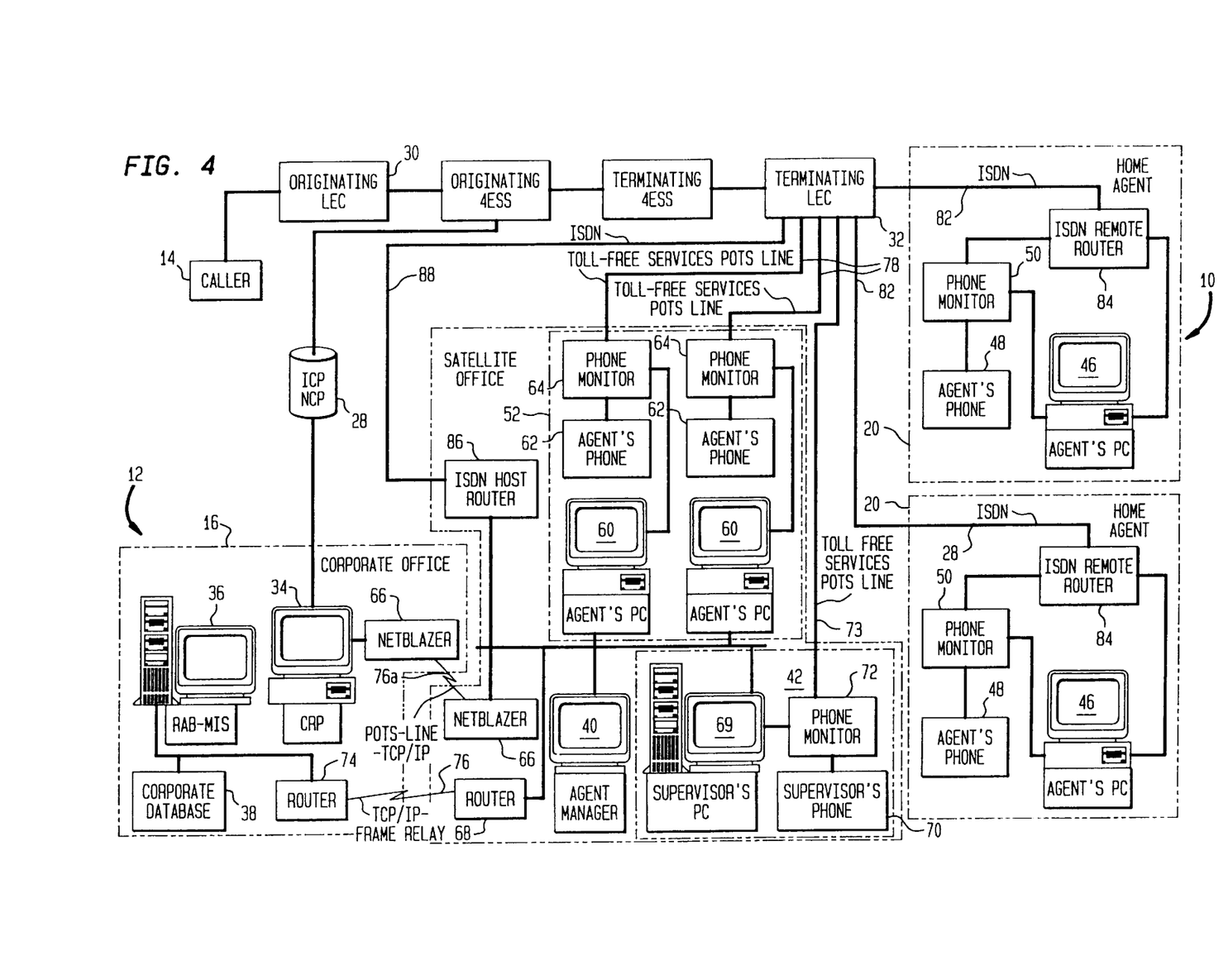
FIG. 4 is a high level schematic diagram of still another embodiment of the present invention showing a home agent connected to the network by an ISDN connection, and the supervisor and agent manager located at a satellite office.

FIG. 4 illustrates another embodiment where the home agent 20 connects into an ISDN line 82 extending to the terminating local exchanger carrier 32. The home agent 20 uses an ISDN remote router 84. The satellite office includes an ISDN host router 86 connected into an ISDN line 88.

Figure 5:
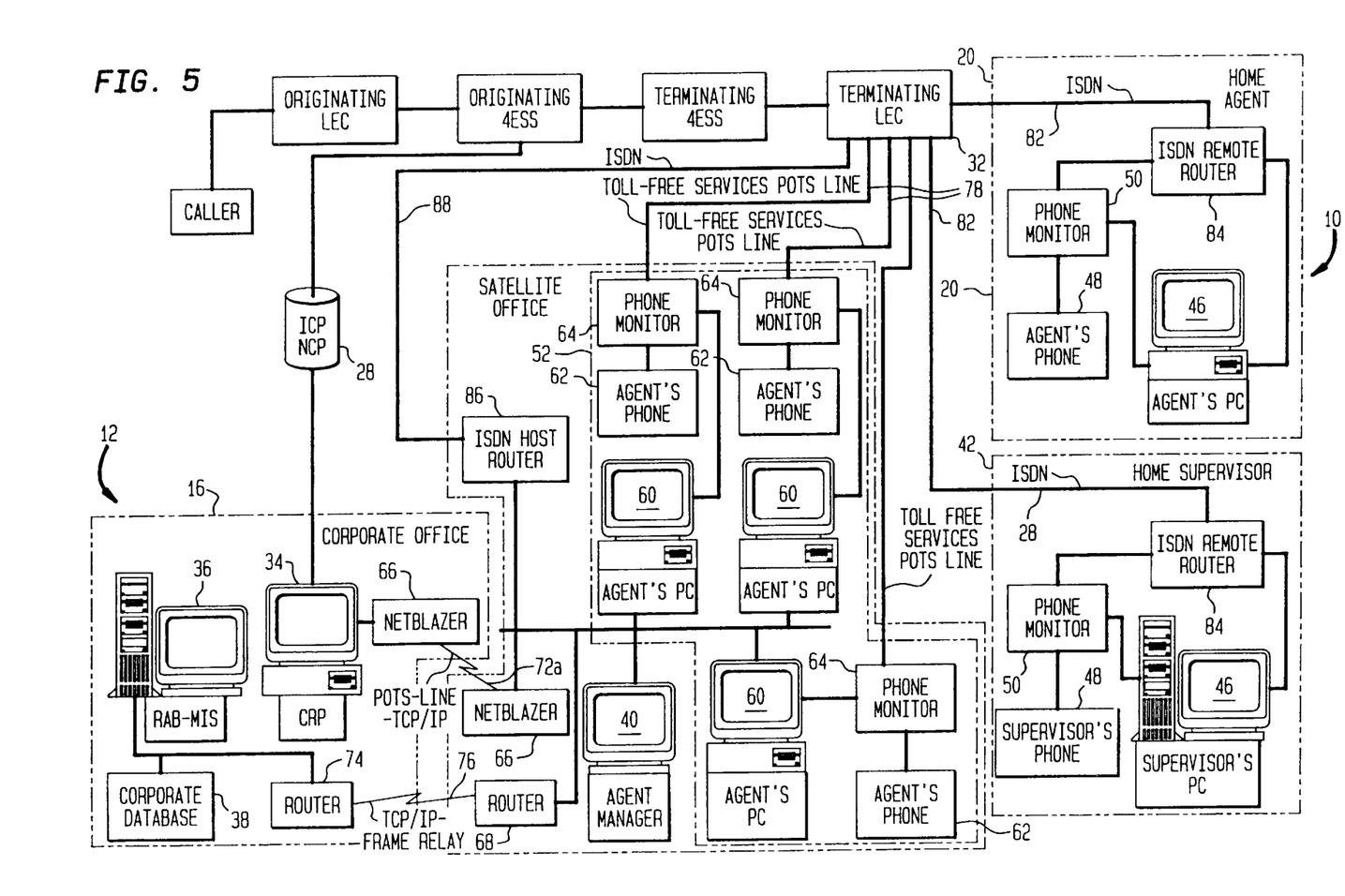
FIG. 5 is a high level schematic diagram of another embodiment of the present invention showing a home agent connected to the network by an ISDN line, the supervisor located at a home premises, and the agent manager located at a satellite office.

FIG. 5 illustrates another embodiment where the home agent 20 is connected via an ISDN line 82 and an ISDN remote router 84 as in FIG. 4. The supervisor 42 is located at a home premises and connected to the terminating local exchange carrier 32 by an ISDN line 90 and ISDN remote router 92. In this particular example, as in FIG. 4, an ISDN host router 86 is located at the satellite office 18 and connected to the terminating local exchange carrier 32. The agent manager 40 is located at the satellite office 18 as before.

Figure 6:
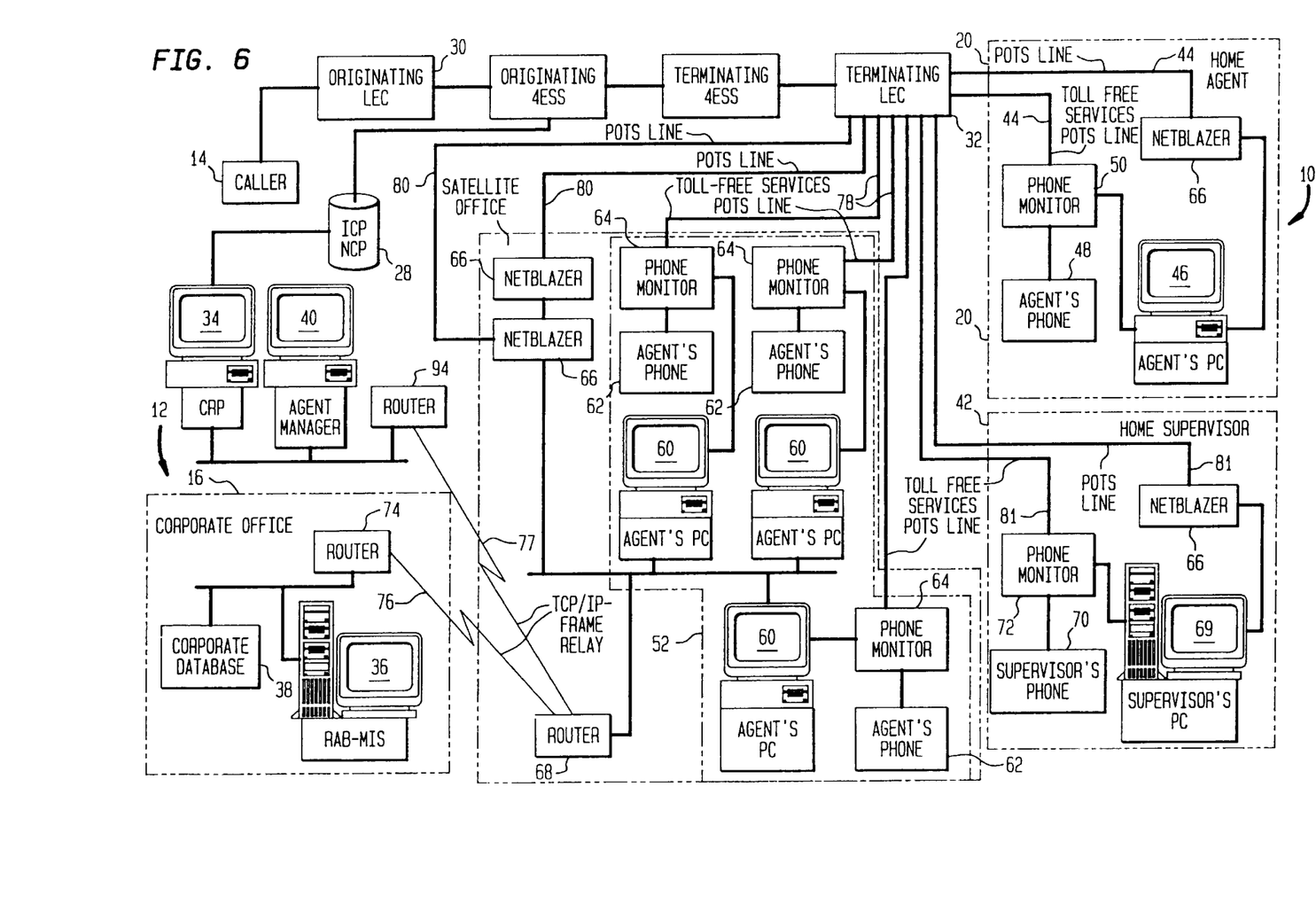
FIG. 6 is a high level schematic diagram of still another embodiment of the present invention showing a home agent connected to the network by a POTS line, a supervisor located at a home premises, and an agent manager as part of the network.

FIG. 6 illustrates another embodiment where the home agents 20 are connected to the terminating local exchange carrier 32 with a POTS line 44 and the Netblazer router 66 as in FIG. 2. The supervisor 42 is located at a home premises and connected by a POTS line 80 to the terminating local exchange carrier 32. The satellite office router 68 connects via a TCP/IP frame rely 76 to a router 74 at the corporate office, which in this embodiment has the customer data base 38 and the management information server 36.

As shown in FIG. 6, the agent manager 40 is part of the intelligent call processing network 24 a separate component. The customer routing point 34 also is part of the network 24. The satellite office router 68 connects through a TCP/IP frame relay 76 to a network router 94 connected to the network agent manager 40 and customer routing point 34.

Figure 7:
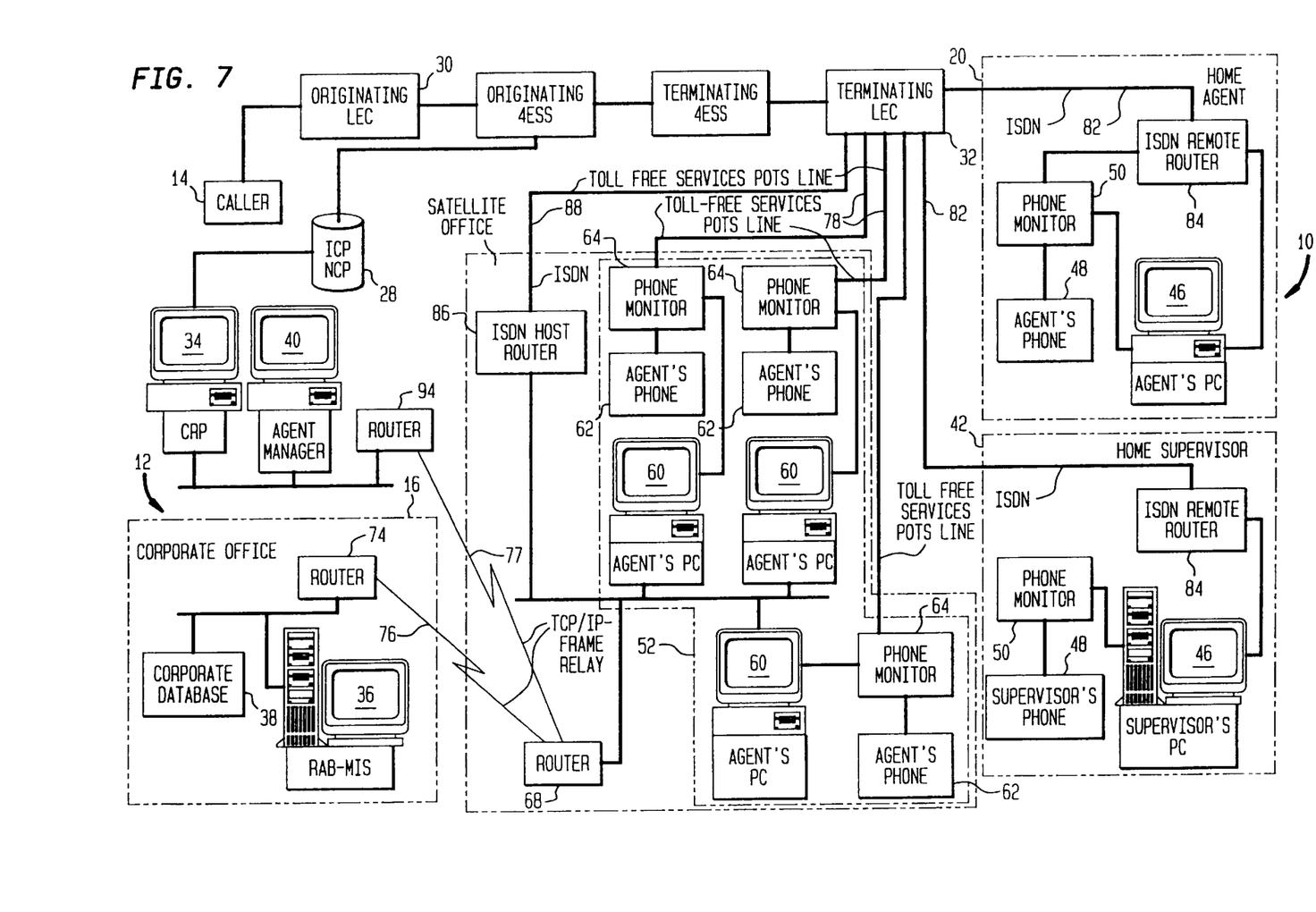
FIG. 7 is a high level schematic diagram of another embodiment of the present invention similar to that shown in FIG. 6 but showing a home agent connected to the network by an ISDN connection, a supervisor located at a home premises, and an agent manager as part of the intelligent call processing network.

FIG. 7 illustrates a home agent 40 and a supervisor 42 located at a home premises and connected via an ISDN line through the respective ISDN remote routers. The remote agents 52 located at the satellite office 18 are connected to the POTS line and the terminating local exchange carrier 32. As in the embodiment shown in FIG. 6, the satellite office router 68 connects through a TCP/IP frame relay to a network router 94 connected to a network agent manager 40 and customer routing point 34.

Referring now again to FIG. 1 the system 10 is also shown integrated with a separate management system, indicated generally at 100, and designated in the industry as TOPMS. This type of management system is described in U.S. Pat. No. 5,164,983 to Brown et al. and 5,390,243 to Casselman et al., the disclosures which are hereby incorporated by reference. The TOPMS system 100 includes data collection means 102 that receives and collects data relating to each incoming call, the status of a transaction, and call origins and status from the Automatic Call Distributors. This data is processed to determine logic patterns for routing calls to the home agents.

The present invention also permits call forwarding and other processing applications if a remote agent 52 or home agent 20 is not available. The customer routing point 34 provides the network control point 28 with overflow treatment instructions in such instances. The overflow instructions can direct the call to be sent to a courtesy response, a network busy, an Automatic Call Distributor site, or another intelligent call processing application on the customer routing point such as NAA-A or ACDN. Additionally, the call could be queued in the intelligent call processing network. The present invention also determines the designation of a call based on event-driven agent availability messages received from the home agent via a pathway through the agent manager 40. These updates provide the system with real-time agent availability status changes of all remote agents.

The customer routing point 34 also includes a storage stack 34*a* (FIG. 1) for maintaining a list of available home agents 40. Calls are typically directed to the home agent that has been available to handle a call the longest resulting in Most Idle Agent Routing. Additionally the customer routing point 34 can be linked to a customer home page on the internet. A person reading the home page may desire further information about a customer's product. When the appropriate button is clicked, a system server queries the customer routing point 34 for an available agent. The system then could establish a voice call, using the Internet.

Additionally, the system of the present invention allows a supervisor to conference in on a call between an agent and a caller, without the caller or agent knowing the supervisor is monitoring the calls. Thus, the supervisor would have the ability to silenty monitor the call as well as talk on the call if necessary. The system of the present invention also provides the ability for an agent to fax documentation to a caller using the agent's personal computer.

Figure 8:
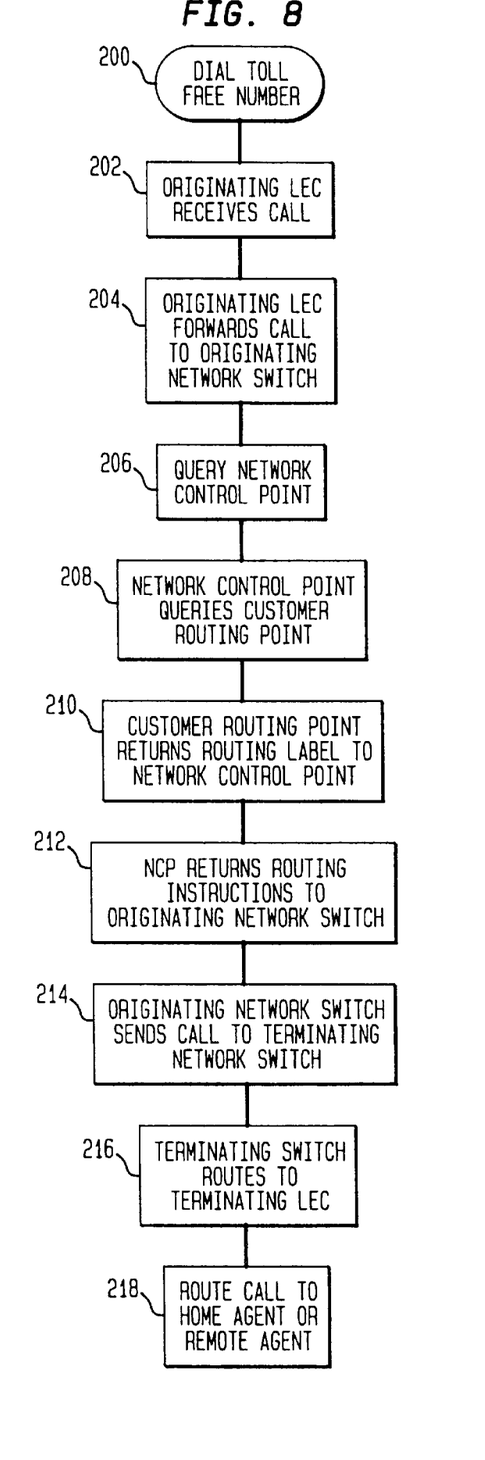
FIG. 8 is a high level flow chart showing the method of the present invention.

Referring now to FIG. 8, there is illustrated a high level flow chart showing a high level methodology of the present invention. For purposes of understanding, the description proceeds with reference numerals beginning in the 200 series. As illustrated, a caller dials a Toll Free Services phone number (Block 200) and the local exchange carrier receives the call (Block 202). The call is forwarded to an originating network switch (Block 204). The originating network switch queries a network control point for routing instructions for this particular call (Block 206). The network control point queries the customer routing point for routing instructions (Block 208). The customer routing point then returns a routing label to the network control point (Block 210). The network control point then returns those routing instructions to the originating network switch (Block 212). The originating network switch sends the call to the terminating network switch (Block 214). The terminating network switch routes the call to the terminating local exchanger carrier (Block 216), which routes the call to a home agent or remote agent (Block 218).

While the best mode for carrying out the invention has been described in detail, those familiar with the art to which the invention relates will recognize various alternative designs and embodiments for practicing the invention as defined by the following claims.

That which is claimed:

1. A system for selecting a home agent destination for a call made to a telecommunications network customer through an intelligent call processing network, the system comprising:

a plurality of home agents, each home agent being located at a home premises;

an agent manager having a database containing information relating to an amount of time each home agent has been idle;

a customer routing point coupled to the intelligent call processing network and to the agent manager, the customer routing point being arranged to respond to a call query from the intelligent call processing network by sending a routing label to the intelligent call processing network, the routing label including call routing information directing a call associated with the call query to a selected home agent destination, the selected home agent destination being based on the home agent indicated in the database as having been idle the longest;

a customer database located at a network customer office, the database storing information relating to individual callers and to previous transactions between the network customer and respective callers; and a supervisor coupled to the agent manager, the supervisor arranged to log into the agent manager and monitor activities of the home agent.

2. The system according to claim 1, wherein the supervisor is located at a home premises.

3. A system for selecting a home agent destination for a call made to a telecommunications network customer through an intelligent call processing network, the system comprising:

a plurality of home agents, each home agent being located at a home premises;

an agent manager having a database containing information relating to an amount of time each home agent has been idle;

a customer routing point coupled to the intelligent call processing network and to the agent manager, the customer routing point being arranged to respond to a call query from the intelligent call processing network by sending a routing label to the intelligent call processing network, the routing label including call routing information directing a call associated with the call query to a selected home agent destination, the selected home agent destination being based on the home agent indicated in the database as having been idle the longest; and a customer database located at a network customer office, the database storing information relating to individual callers and to previous transactions between the network customer and respective callers.

4. A system for selecting a home agent destination for a call made to a telecommunications network customer through an intelligent call processing network, the system comprising:

a plurality of home agents, each home agent being located at a home premises;

an agent manager having a database containing information relating to an amount of time each home agent has been idle;

a customer database located at a network customer office, the database storing information relating to individual callers and to previous transactions between the network customer and respective callers; and a customer routing point coupled to the intelligent call processing network and to the agent manager, the customer routing point being arranged to respond to a call query from the intelligent call processing network by sending a routing label to the intelligent call processing network, the routing label including call routing information directing a call associated with the call query to a selected home agent destination, the selected home agent destination being based on the home agent indicated in the database as having been idle the longest;

wherein the customer routing point is arranged to queue a call within the intelligent call processing network when a home agent is unavailable for receiving the call.

5. A method for selecting a home agent destination for a call made to a telecommunications network customer through an intelligent call processing network, the method comprising the steps of:

receiving a call to a network customer through the intelligent processing network;

querying a customer routing point for determining a home agent destination, the home agent destination being one of a plurality of home agent destinations, each home agent destination being located at a home premises;

sending a routing label to the intelligent call processing network, the routing label including call routing information directing a call to a selected home agent destination, the selected home agent destination being based on the home agent indicated in a database as having been idle the longest;

routing the call to the selected home agent based on the call routing information;

monitoring a home agent by an agent manager;

storing information in the database, the information relating to an amount of time each home agent has been idle;

storing in a customer database, located at a network customer office, the database storing information relating to individual callers and to previous transactions between the network customer and respective callers; and maintaining agent availability information, routing configurations and statistical information relating to log-in and usage by home agents within the agent manager.

6. A method for selecting a home agent destination for a call made to a telecommunications network customer through an intelligent call processing network, the method comprising the steps of:

receiving a call to a network customer through the intelligent processing network;

querying a customer routing point for determining a home agent destination, the home agent destination being one of a plurality of home agent destinations, each home agent destination being located at a home premises;

sending a routing label to the intelligent call processing network, the routing label including call routing information directing a call to a selected home agent destination, the selected home agent destination being based on the home agent indicated in a database as having been idle the longest;

routing the call to the selected home agent based on the call routing information;

monitoring a home agent;

storing information in the database, the information relating to an amount of time each home agent has been idle;

storing in a customer database, located at a network customer office, the database storing information relating to individual callers and to previous transactions between the network customer and respective callers; and remotely monitoring activity of the agent manager by a supervisor, the supervisor being operatively connected to the agent manager.

7. A method for selecting a home agent destination for a call made to a telecommunications network customer through an intelligent call processing network, the method comprising the steps of:

receiving a call to a network customer through the intelligent processing network;

querying a customer routing point for determining a home agent destination, the home agent destination being one of a plurality of home agent destinations, each home agent destination being located at a home premises;

sending a routing label to the intelligent call processing network, the routing label including call routing information directing a call to a selected home agent destination, the selected home agent destination being based on the home agent indicated in a database as having been idle the longest;

routing the call to the selected home agent based on the call routing information;

monitoring a home agent;

storing information in the database, the information relating to an amount of time each home agent has been idle;

storing in a customer database, located at a network customer office, the database storing information relating to individual callers and to previous transactions between the network customer and respective callers; and receiving transaction information associated with individual callers, the information associated with each respective caller relating to previous transactions between the caller and the network customer.

8. A method for selecting a home agent destination for a call made to a telecommunications network customer through an intelligent call processing network, the method comprising the steps of:

receiving a call to a network customer through the intelligent processing network;

querying a customer routing point for determining a home agent destination, the home agent destination being one of a plurality of home agent destinations, each home agent destination being located at a home premises;

sending a routing label to the intelligent call processing network, the routing label including call routing information directing a call to a selected home agent destination, the selected home agent destination being based on the home agent indicated in a database as having been idle the longest;

routing the call to the selected home agent based on the call routing information;

monitoring a home agent;

storing information in the database, the information relating to an amount of time each home agent has been idle;

storing in a customer database, located at a network customer office, the database storing information relating to individual callers and to previous transactions between the network customer and respective callers; and queuing a call within the intelligent call processing network when a home agent is unavailable for receiving the call.

* * * * *